(12) United States Patent
Johansson

(10) Patent No.: US 11,867,130 B2
(45) Date of Patent: Jan. 9, 2024

(54) REVERSIBLE BLEED CONFIGURATION

(71) Applicant: GKN Aerospace Sweden AB, Trollhättan (SE)

(72) Inventor: Peter Johansson, Trollhättan (SE)

(73) Assignee: GKN Aerospace Sweden AB, Trollhättan (SE)

(*) Notice: Subject to any disclaimer, the term of this patent is extended or adjusted under 35 U.S.C. 154(b) by 76 days.

(21) Appl. No.: 17/609,824

(22) PCT Filed: May 7, 2020

(86) PCT No.: PCT/EP2020/062737
§ 371 (c)(1),
(2) Date: Nov. 9, 2021

(87) PCT Pub. No.: WO2020/229305
PCT Pub. Date: Nov. 19, 2020

(65) Prior Publication Data
US 2022/0220903 A1    Jul. 14, 2022

(30) Foreign Application Priority Data
May 10, 2019 (GB) .................... 1906638

(51) Int. Cl.
*F02C 9/18* (2006.01)
*F02C 6/08* (2006.01)
*F02K 3/075* (2006.01)
*F04D 29/54* (2006.01)

(52) U.S. Cl.
CPC .............. *F02C 9/18* (2013.01); *F02K 3/075* (2013.01); *F02C 6/08* (2013.01); *F04D 29/545* (2013.01); *F05D 2220/323* (2013.01); *F05D 2260/606* (2013.01); *F05D 2270/101* (2013.01)

(58) Field of Classification Search
CPC .... F02C 6/08; F02C 9/18; F02K 3/075; F04D 29/545; F05D 2260/606; F05D 2270/101; F05D 2220/323; F16K 11/0655; F16K 11/065
See application file for complete search history.

(56) References Cited

U.S. PATENT DOCUMENTS

2015/0159560 A1*  6/2015  Kumar .............. F02C 7/30
                                                    60/785
2018/0252184 A1*  9/2018  Hatim ............... F02K 3/075

FOREIGN PATENT DOCUMENTS

EP   3184781 A1   6/2017
GB   1472033 A    4/1977

OTHER PUBLICATIONS

International Search Report and Written Opinion for PCT/EP2020/062737 dated Jul. 17, 2020 (11 pages).

* cited by examiner

*Primary Examiner* — Todd E Manahan
*Assistant Examiner* — Rodolphe Andre Chabreyrie
(74) *Attorney, Agent, or Firm* — Bejin Bieneman PLC (57) ABSTRACT

An airflow arrangement for a gas turbine engine in which air can be selectively directed to and from a bypass channel of the engine and into a duct communicating air into a compressor of a gas turbine engine.

17 Claims, 5 Drawing Sheets

REVERSIBLE BLEED CONFIGURATION

CROSS-REFERENCE TO RELATED APPLICATIONS

This application is a national stage of, and claims priority to, Patent Cooperation Treaty Application No. PCT/EP2020/062737, filed on May 7, 2020, which application claims priority to Great Britain Application No. GB 1906638.0, filed on May 10, 2019, which applications are hereby incorporated herein by reference in their entireties.

BACKGROUND

A typical gas turbine engine comprises a pair of compressors, namely a first upstream low pressure compressor and a second, downstream, high pressure compressor. The pair of compressors compress air entering the engine in two-stages before the compressed gas is communicated into the combustors where fuel is introduced and the mixture ignited. The operation of a gas turbine engine is well known to a person skilled in the art and will not be described in detail.

The compressors are generally optimised for in-flight conditions, i.e., when the aircraft is at cruise speed and altitude. In cruise conditions sufficient air is drawn into the first low pressure compressor and compressed to a first pressure. The air is then communicated through a transition duct between the two compressors to the second high pressure compressor before being introduced into the combustors.

When the aircraft is not in flight, for example taxiing for take-off, very different air-flow conditions exist within the engine. For example, in situations where the engine is running at low speed (for example for taxi) the air demands of the compressor(s) will be very much lower than at cruise.

In such situations compressor stalls may occur. This occurs when there is a disparity between the air being introduced into the compressor(s) and the air the compressors can compress at the given rotational speed. Stalls can result in momentary loss of power or in extreme cases engine damage.

In order to prevent compressor stall at low speeds modern gas turbine engines are provided with a flow path that allows air to be diverted away from the compressors thereby preventing stalling conditions. This air is known as compressor bleed air.

Numerous methods have been adopted by different engine manufacturers to divert air away from the compressor.

In one example, holes are provided on the inside of the duct which channels air to the compressor(s). The holes form air passages that allow air to flow out of the duct to the engine bypass channel (the channel surrounding the core in a gas turbine engine). A butterfly valve may for example be used to automatically control the air bleed (also known in the art as 'level of handling bleed').

In another example of an existing system, a flap or door may be provided which again may be opened in the same way to release air to the bypass channel.

In yet another example, a 'scoop' may extend into the duct with a suitable valve which, when opened, gathers air from the duct and again communicates it to the bypass channel.

Each of these existing arrangements has proven to be highly effective in bleeding air from the compressor duct and preventing compressor stalls.

Airflow is also sometimes required to flow in the opposite direction, i.e., ingestion of air rather than bleed. This is a special case of an engine with a variable pitch fan where ingestion may be required during braking of the aircraft on landing for example. This is also known as "thrust reverse". In conventional arrangements there are mechanical flaps that redirect the bypass flow outwards which acts as an airbrake.

SUMMARY

The present disclosure is concerned with an improved gas turbine arrangement. Specifically, but not exclusively, the invention is concerned with an alternative air bleed configuration for use in conjunction with a low pressure compressor (LPC) and/or a high pressure compressor (HPC) of a gas turbine engine. Disclosed herein is an alternative manner in which air bleed can be realised and which provides additional advantages beyond those provided for with existing air bleed systems in gas turbine engines.

Viewed from a first aspect there is provided an air-bleed/air-ingress arrangement for a gas turbine engine, the gas turbine engine comprising a bypass channel and an engine core, the engine core comprising a duct arranged in use to channel air towards a compressor and an air flow passage extending from the bypass channel through the core and towards the duct, the arrangement further comprising a first air-bleed port arranged in use to fluidly connect the duct and the airflow passage and configured to communicate air from the duct to the bypass channel and a second air-ingress port arranged in use to fluidly connect the duct and the airflow passage and configured to communicate air from the bypass channel to the duct.

The present disclosure describes a novel air bleed and air ingress configuration that provides for extremely versatile control of air in the compressor (transition) duct. Specifically, the arrangement allows the volume of air being communicated to the compressor to be accurately controlled and optimised for all landing and flight conditions.

The arrangement can additionally prevent reverse flow of air, and combustion products from the combustors, through the compressor and duct towards the front of the engine.

As described herein it is possible to selectively either allow air to be released from the transition duct into the bypass channel or to allow air from the bypass channel to be communicated to the transition duct. This control can be achieved whilst the engine is in operation by reciprocal movement of a body incorporating the one or more channels.

The first air-bleed port and second air-ingress port may be one of a plurality of ports arranged circumferentially with respect to the core of an engine. This may allow for airflow from particular positions around the engine or from within the engine. Depending on the engine operating conditions one or more ports may be needed.

The first air-bleed port and second air-ingress port may advantageously be integrally formed in a single circumferentially extending body or a pair of circumferentially extending bodies arranged in use to abut one another (i.e., to be placed immediately adjacent to each other or suitably close together). For example, the (or each) body may be in the form of a ring or torus with air-flow channels extending from a surface of the ring facing the central axis of the ring and outwards towards a surface radially displaced from the axis. In effect the flow channels are formed so as to pass generally radially outwards through the ring or torus. There may be a single body or a pair of bodies positioned back-to-back. They may for example be mirror images of each other.

The (or each) body may for example comprise an inner surface facing, in use, a core of an engine and an outwardly facing surface facing, in use, a bypass channel of an engine, wherein the ports extend from the inner surface to the outer surface. This allows for the selective control of air between a channel in the core of the engine towards or from a bypass channel of the engine.

The first air-bleed port and second air-ingress port are one or more discrete ports arranged circumferentially with respect to an engine core.

Advantageously the body may be movable with respect to an engine core to open or close an air-bleed port or an air-ingress port. Air-bleed is intended to refer to air released from a duct or transition duct within the core of a gas turbine engine towards a bypass-channel or similar. Air-ingress is intended to refer to the opposite, i.e., air allowed to flow from the bypass channel towards and into a duct or transition duct of a gas turbine engine upstream of one or more compressors.

The body may move along the axis of the engine to cause the selective opening and closing of the ports described herein. For example, axial movement in a first direction may cause a port to open allowing air to flow radially outwards through the port. Conversely axial movement in a second opposing direction may cause a port to open allowing air to flow radially inwards through the port.

The axial movement may be achieved in any suitable way and by a range of power sources. For example, axial movement may be caused by means of one or more linear actuators arranged to cause the body to move in a first and second opposing direction.

Advantageously the ports may be movable between:
(A) a first position allowing bleed air to flow radially outwards from a transition duct to a bypass channel;
(B) a second position in which air is unable to flow to or from a transition duct; and
(C) a third position allowing ingress-air to flow radially inwards from a bypass duct to a transition duct.

Thus, full control of air into and out of the transition duct can be achieved including a position where air is neither permitted to leave or enter the transition duct from or to the bypass channel. For example, the ports may be selectively movable to intermediate positions between the first and second positions and intermediate positions between the second and third positions.

The ports extending from the core to the bypass channel may be any suitable aerodynamic shape or profile (cross-section) that allows for the efficient flow of air therethrough. For example, one or all of the first air-bleed port(s) may be provided with a curved profile curving radially outwards so that a downstream end of the port directs air in use in a radially outward direction with respect to an axis of an engine.

Similarly, one or all of the second air-ingestion ports may be provided with a curved profile curving radially inwards so that a downstream end of the port directs air in use into a transition duct with a component of flow along an axis of the transition duct.

Viewed from another aspect there is provided an auxiliary air supply arrangement for a compressor of a gas turbine engine, the gas turbine engine comprising a bypass channel and an engine core containing a duct arranged to communicate air to a compressor, wherein one or more airflow passages is/are provided and configured to selectively operate in a first mode to supply air from the bypass channel to the duct or in a second mode to supply air from the duct to the bypass channel.

As described herein the arrangement may advantageously be selectively controllable to operate in a first or second mode of operation and optionally a position in which no air is permitted to flow into or out of the duct.

Viewed from a still further aspect there is provided an air bypass arrangement for a gas turbine engine comprising a movable body arranged around a central axis of rotation of a gas turbine engine and arranged in use to reciprocate along a portion of said axis, the body comprising
at least one first upstream air-flow channel extending from a portion of the body proximate to the axis radially outwards and away from the axis to allow air-flow away from the axis, and
at least one second downstream air-flow channel extending from a portion of the body radially disposed from the axis radially inwards and towards the axis to allow air-flow towards the axis.

As described herein a circumferentially located body may be provided within the core of the engine which can selectively either allow air to bleed from a transition duct out of the engine (for example into the bypass channel) or allow air ingress into the transition duct from the outside of the engine (for example from the bypass channel).

To allow for the efficient flow of air through the arrangement without causing detrimental pressure differences within the engine or the like, an inlet to the first up-stream channel may be upstream from an outlet of the first up-stream channel when measured along the engine in an airflow direction.

Similarly, and for the same reasons, an inlet to the second downstream channel may be upstream from an outlet of the second downstream channel when measured along the engine in an airflow direction.

Thus, as described above, the first upstream channel is arranged in use to allow air to flow from a transition duct of a gas turbine engine towards a bypass channel of the gas turbine engine and the second down-stream channel is arranged in use to allow air flow from a bypass channel of a gas turbine engine towards a transition duct of the gas turbine engine.

The arrangement may advantageously allow for the selection of which way the air is permitted to flow by movement of the body in an axial direction towards the front of the engine or to the rear of the engine. Specifically, reciprocation of the body along the axis of the gas turbine engine selectively either:
(A) opens the first upstream channel to allow airflow and closes the second downstream channel; or
(B) opens the second downstream channel to allow airflow and closes the first upstream channel.

Viewed from yet another aspect there is provided a gas turbine engine comprising an arrangement as described herein and also an aircraft comprising one or more gas turbine engines as described herein.

Viewed from a still further aspect there is provided a method of selectively controlling the flow of air into a compressor of a gas turbine engine using an arrangement described herein, wherein air is selectively caused in use to flow either:
(A) from a channel communicating air to a compressor to a bypass channel; or
(B) from a bypass channel to a channel communicating air to the compressor.

In such an arrangement an aircraft may be provided with automatic control of the air flow in response to a stall determination for example.

Viewed from another aspect there is provided a method of manufacturing an air flow arrangement for a transition duct as described herein.

DRAWINGS

Examples will now be described with reference to the accompanying figures in which.

While the present teachings are susceptible to various modifications and alternative forms, specific embodiments are shown by way of example in the drawings and are herein described in detail. It should be understood, however, that drawings and detailed description thereto are not intended to limit the scope to the particular form disclosed, but on the contrary, the scope is to cover all modifications, equivalents and alternatives falling within the spirit and scope defined by the appended claims.

As used in this specification, the words "comprises", "comprising", and similar words, are not to be interpreted in an exclusive or exhaustive sense. In other words, they are intended to mean "including, but not limited to".

It will be recognised that the features of the aspects of the invention(s) described herein can conveniently and interchangeably be used in any suitable combination. It will also be recognised that the invention covers not only individual embodiments but also combinations of the embodiments that have been discussed herein.

DETAILED DESCRIPTION

Figure 1:
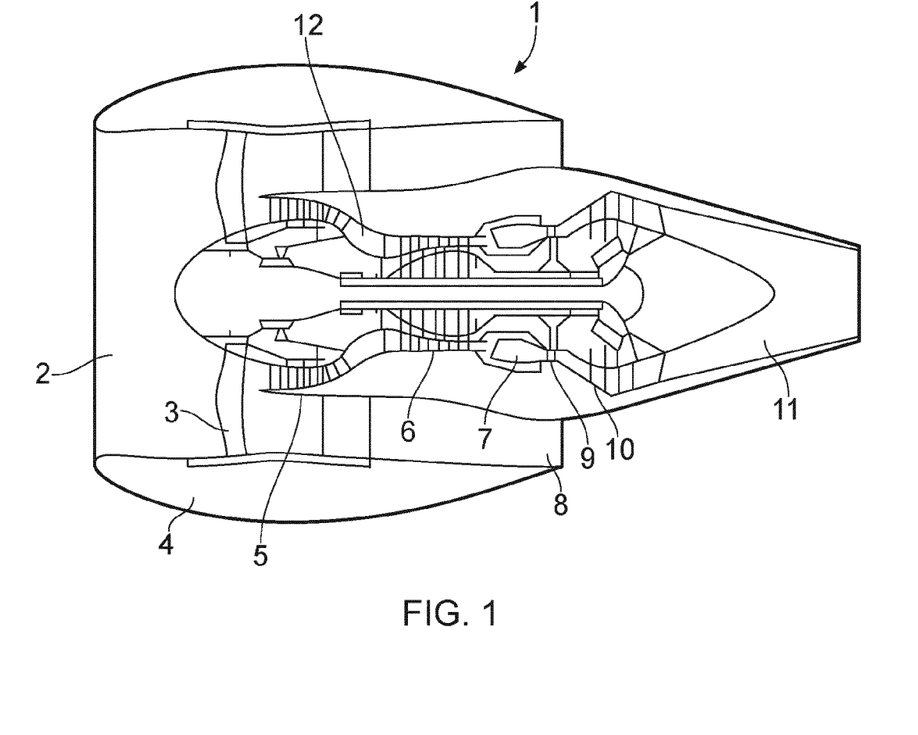
FIG. 1 shows a cross-section of a gas turbine engine incorporating an air flow arrangement.

FIG. 1 shows a cross-section of a gas turbine engine 1 which may incorporate an air bleed configuration as described in detail below.

The skilled person will understand the principal components of a gas turbine engine and their operation. In summary the engine 1 comprises an air intake 2 which permits air to flow into the engine to the fan 3 located at the upstream end of the engine. All of the components are housed within the engine nacelle 4.

The engine comprises a bypass channel downstream of the fan and a central engine core which contains the compressors, combustors and turbines. The core of the engine is formed of a first low pressure compressor (LPC) 5 and a second high pressure compressor (HPC) 6. This multi-stage compressor arrangement takes air from ambient pressure and temperature to high temperature and pressure. Compressed air is then communicated to the combustion chamber 7 where fuel is injected and combustion occurs.

The combustion gases are expelled from the rear of the combustions chamber 7 and impinge first on a high pressure turbine 9 and then on a second low pressure turbine 10 before leaving the rear of the engine through the core nozzle 11. Thrust from the engine is created by two gas flows: a first from the fan nozzle 8 (receiving thrust from the fan) and secondly from the exhaust gases from the core nozzle 11.

Note the air flow within the transition duct 12 which is located between the low pressure compressor 5 and the high pressure compressor 6. The transition duct 12 is an annular passage that extends around the core and which channels air between the two compressors.

Figure 2:
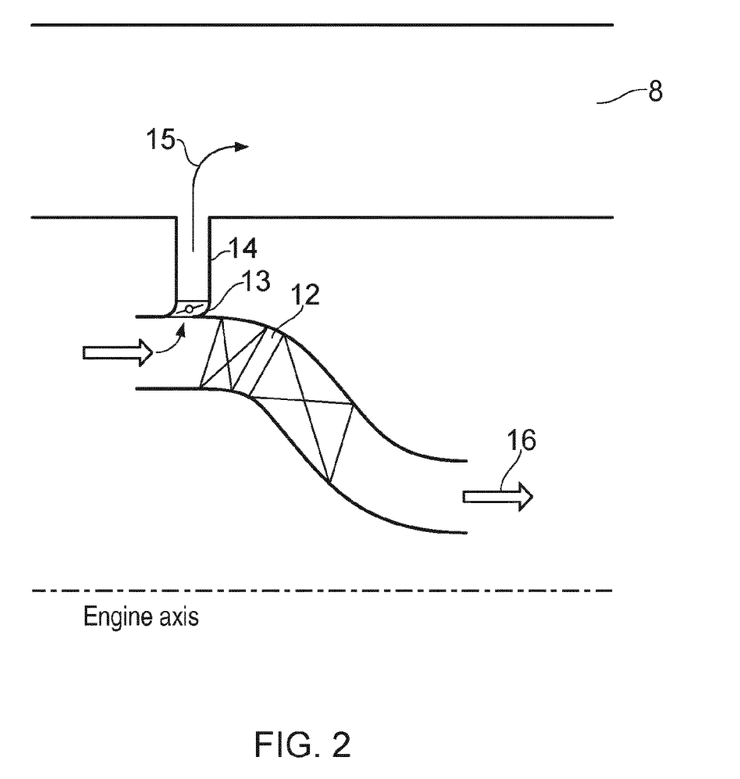
FIG. 2 shows a schematic of a conventional air bleed arrangement for a gas turbine engine.

FIG. 2 illustrates a conventional air bleed system. In effect a portion of the wall of the transition duct is opened to allow air to escape outwards instead of being channelled to the second high pressure compressor. As described above this can be done in a variety of ways and different engine manufacturers have adopted different solutions to release air from the transition duct.

In FIG. 2 a simple butterfly 13 valve is located adjacent to the wall of the duct 12 and allows for selective opening and closing. The valve is connected to the channel 14 which extends through a portion of the core to the bypass channel 8 where the air can escape. Thus, in conditions where only small volumes of air are required by the compressor any excess air can be released or bled into the bypass channel preventing compressor stall. As also described above, such arrangements are highly effective in preventing compressor stall.

When the butterfly valve 13 is opened, a component of air flows along the path shown by the arrows 15. When the butterfly valve 13 is closed, all air flows along the transition duct as shown by arrow 16 and to the high pressure compressor (not shown in FIG. 2).

Reverse thrust essentially involves redirecting the airflow that would normally be directed out of the rear of the engine either radially outwards or fully or partially backwards i.e. in an opposing direction to the normal airflow. This dramatically reduces the thrust generated by the engine and allows the aircraft to stop more quickly. This may be achieved for example by opening panels on the outer sides of the bypass channel to allow air to flow radially outwards instead of in a rearwards direction.

For conventional engines, thrust reverse means an axial flow through the bypass channel (outside of the engine core) in the direction of motion of the aircraft. For aircraft with fan blades which have an adjustable angle this presents a particular problem. In such engines the fan can be used as a thrust reverser instead of using movable panels. There can then be a situation where the flow in the by-pass channel is slowed down or even reversed compared to the core flow so that the engine fails to function. Then, ingestion instead of bleed can be required.

In such situations it is desirable to increase the airflow into the compressors as opposed to bleeding air out of the compressors. In effect in these situations is it desirable to ingest additional air from the bypass channel into the duct and thereby into the compressor(s).

Figure 3:
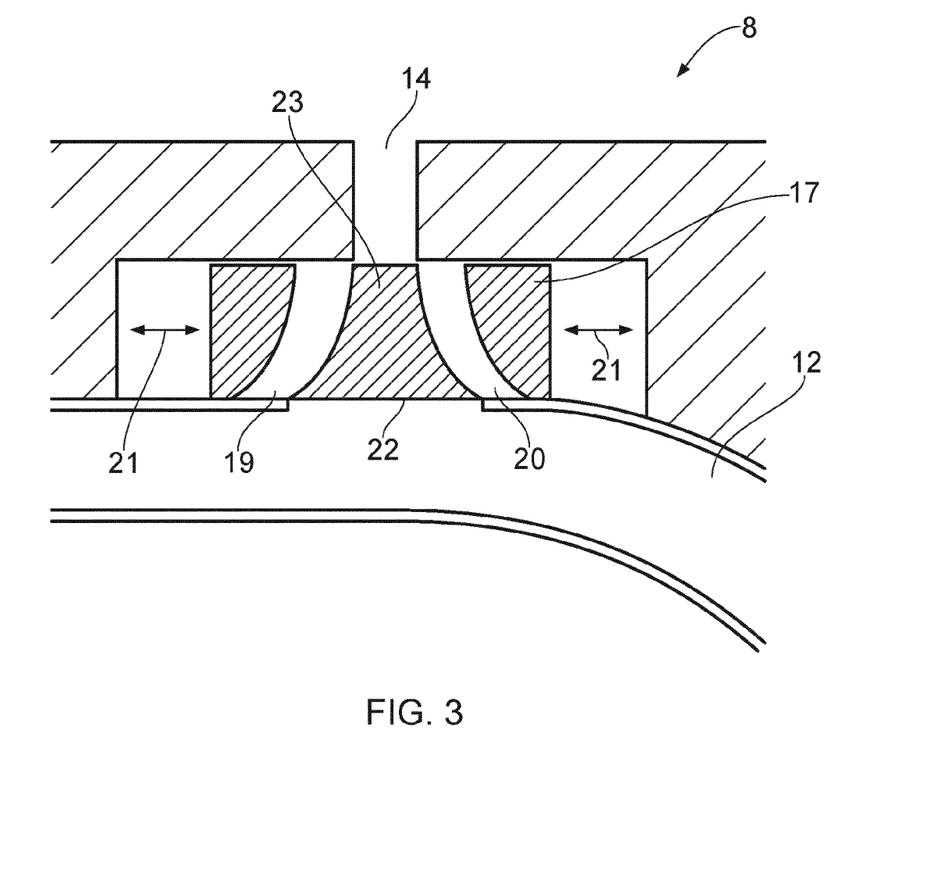
FIG. 3 shows a schematic of a multi-direction air flow arrangement.
Figure 4:
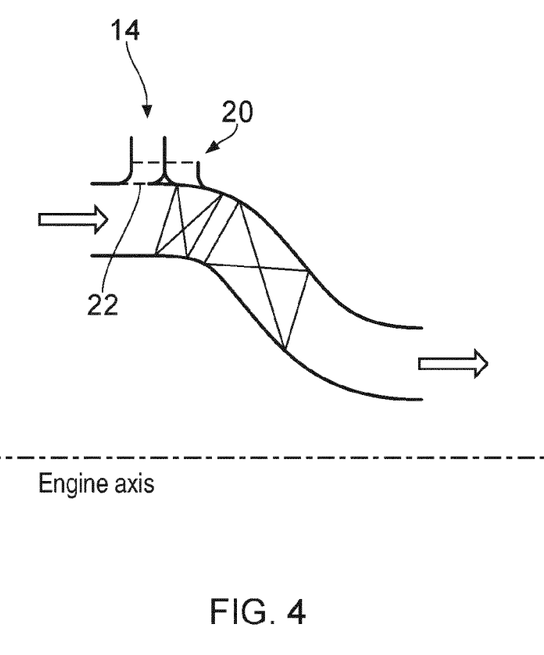
FIG. 4 shows a schematic of the arrangement shown in FIG. 3 in an air bleed mode of operation.
Figure 5:
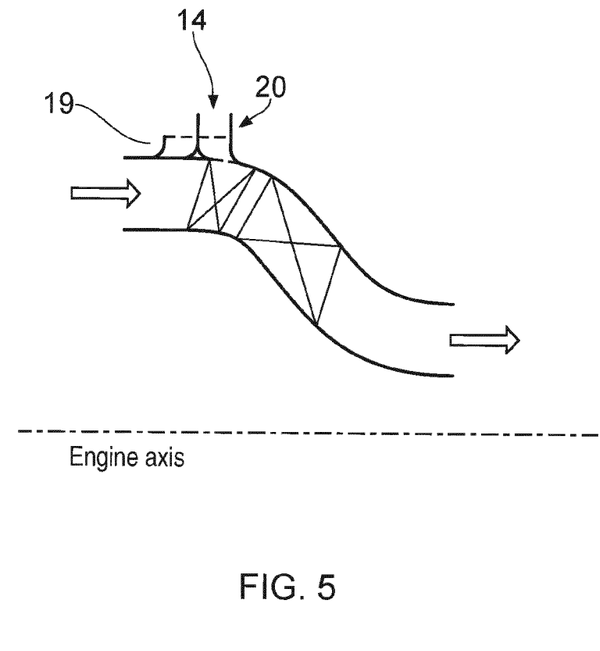
FIG. 5 shows a schematic of the arrangement shown in FIG. 3 in an air ingress mode of operation.

FIGS. 3 to 5 illustrate one example embodiment in which a multi-directional air bleed/air ingestion configuration is provided.

FIG. 3 shows a schematic of the air control arrangement.

The arrangement comprises a cylindrical body 17 that extends around the outer surface of the transition duct 12. The body defines two passageways 19, 20 for airflow.

The first passageway is an air bleed passageway 19 which, when used, connects the transition duct 12 to the passageway 14. In this mode of operation a conventional air bleed path is provided to prevent compressor stall as described above. As shown the profile or shape of the passageway 19 is such that air is caused to flow smoothly out of the transition duct towards the bypass channel 8.

The second passageway is an air ingress passageway 20 which, when used, connects the bypass channel 8 to the transition duct but with an opposing profile or shape. When connected to the channel 14 the bypass channel air is caused to be drawn into the transition duct and is communicated to the high pressure compressor (not shown in FIG. 3).

Because of pressure, when the blades of the variable pitch fan are turned to reverse the flow in the bypass channel (to brake the aircraft) a flow into the high pressure compressor is required and this is achieved using a reversible bleed. In this case air will flow into the compressor due to the pressure difference.

As shown by arrows 21 the body is arranged to move axially with respect to the engine using a suitable actuator, such as linear actuator or actuators (or the like) which move (push or pull) the ring axially into or out of position. The body can thereby be moved between a first maximum position in which the air bleed path is fully open to a second maximum position where the air ingestion path is fully open.

Advantageously the body may be moved to any position therebetween depending on the desired volume of airflow and, importantly, direction of airflow, i.e., into or out of the transition duct. Similarly, the body may be positioned in a closed position (as shown in FIG. 3) in which air is neither communication into or out of the duct or bypass channel. This may be example be used in a normal flight mode of operation.

Thus, a compressor stall can be prevented and additionally any reverse flow through the compressors can be avoided.

As discussed above and also shown in FIG. 3 a central position is also provided in which the transition duct 12 is sealed from the channel 14. The port 22 in the outer wall of the transition duct is sealed by the central part 23 of the body 17.

The curvature of the ports may be selected according to the different airflow rates which must be transported into or out of the engine.

The arrangement may be formed of a single continuous ring or alternatively a number of discrete portions forming ports which are distributed around the circumference of the core.

FIGS. 4 and 5 illustrate the air control arrangement in the two modes of operation.

FIG. 4 shows the arrangement in an air bleed mode where the body has been moved in an aft direction (along the axis of the engine). This aligns the air bleed port with the channel 14. As shown the second port 20 has been moved away from the port 22 allowing for air communication from the duct towards the bypass channel.

FIG. 5 shows the arrangement in an air ingress or air ingestion mode. The body has been moved in the opposite direction, i.e., towards the front of the engine to align the passageway 20 with the channel 14 and port 22. This thereby allows air to flow from the bypass channel to into the duct.

In use, the aircraft control systems cannot only select the amount of air which is communicated through the transition duct but also the direction, i.e., from or to the bypass channel. Alternatively automatic control may be provided and the air control arrangement controlled to optimise the airflow within the compressors.

The circumferential (or segmented) body may move in a simple linear manner using linear actuation as described above. The movement may be controlled by means of a ridge and a channel into which the ridge is located to control the movement.

In another arrangement the channels may be generally S-shaped or serpentine so as to release air into the bypass channel or duct as a flow more in-line with the respective air flow.

In effect air being discharged into the bypass channel may be released into the bypass channel so as to have a flow direction generally corresponding to the flow direction of the air in the bypass channel. Similarly, air being discharged into the transition duct may be released into the transition duct so as to have a flow direction generally corresponding to the flow direction in the transition duct.

The invention claimed is:

1. A gas turbine engine arrangement, comprising:
a gas turbine engine including a bypass channel and an engine core that includes a transition duct arranged to channel air towards one or more compressors and an air flow passage extending from the bypass channel through the core and towards the transition duct;
a first port arranged to fluidly connect the transition duct and the airflow passage and configured to communicate air from the transition duct to the bypass channel; and
a second port arranged to fluidly connect the transition duct and the airflow passage and configured to communicate air from the bypass channel to the transition duct;
wherein the first port and second port are integrally formed in a single circumferentially extending body, or a pair of circumferentially extending bodies arranged to abut one another, wherein the single circumferentially extending body, or the pair of circumferentially extending bodies, each include either a ring or a torus.

2. The arrangement of claim 1, wherein the first port and the second port are included in a plurality of ports arranged circumferentially with respect to the engine core.

3. The arrangement of claim 1, wherein the single circumferentially extending body or the pair of circumferentially extending bodies each comprise an inner surface facing the engine core, and an outwardly facing surface facing the bypass channel of the engine, wherein the ports extend from the inner surface to the outer surface.

4. The arrangement of claim 1, wherein the first port and the second port are one or more discrete pairs of ports arranged circumferentially with respect to the engine core.

5. The arrangement of claim 1, wherein a body comprising the first port or the second port is movable with respect to the engine core to open or close the first port or the second port.

6. The arrangement of claim 5, wherein the body is movable in an axial direction with respect to the axis of an engine.

7. The arrangement of claim 6, wherein axial movement in a first direction causes one of the discrete ports to open allowing air to flow radially outwards through the one of the discrete ports and axial movement in a second opposing direction causes another one of the discrete ports to open allowing air to flow radially inwards through the another one of the discrete ports.

8. The arrangement of claim 7, wherein axial movement is caused by one or more linear actuators arranged to cause the body to move in a first and second opposing direction.

9. The arrangement of claim 1, wherein the first and second ports are movable between:
(A) a first position allowing bleed air to flow radially outwards from the transition duct to the bypass channel;
(B) a second position in which air is unable to flow to or from the transition duct; and
(C) a third position allowing ingress-air to flow radially inwards from the bypass channel to the transition duct.

10. The arrangement of claim 9, wherein the first and second ports are selectively movable to intermediate positions between the first and second positions and intermediate positions between the second and third positions.

11. The arrangement of claim 1, wherein the first port is provided with a curved profile curving radially outwards so that a downstream end of the first port directs air in a radially outward direction with respect to an axis of an engine.

12. The arrangement of claim 1, wherein the second port is provided with a curved profile curving radially inwardly so that a downstream end of the second port directs air into the transition duct with a component of flow along an axis of the transition duct.

13. An air bypass arrangement for a gas turbine engine comprising a movable body arranged around a central axis of rotation of the gas turbine engine and arranged to reciprocate along a portion of the central axis, wherein the body includes:
- at least one upstream air-flow channel extending from a portion of the body proximate to the central axis radially outwards and away from the axis to allow air-flow away from the central axis, and
- at least one downstream air-flow channel extending from a portion of the body radially disposed from the central axis radially inwards and towards the central axis to allow air-flow towards the axis.

14. The air bypass arrangement of claim 13, wherein an inlet to at least one up-stream channel is upstream from an outlet of the up-stream channel when measured along the engine in an airflow direction.

15. The air bypass arrangement of claim 13, wherein an inlet to the downstream channel is upstream from an outlet of the downstream channel when measured along the engine in an airflow direction.

16. The air bypass arrangement of claim 13, wherein at least one of (a) the upstream channel is arranged to allow air to flow from a transition duct of thea gas turbine engine towards a bypass channel of the gas turbine engine, or (b) the down-stream channel is arranged to allow air to flow from a bypass channel of a gas turbine engine towards a transition duct of the gas turbine engine.

17. The air bypass arrangement of claim 13, wherein reciprocation of the body along the axis of the gas turbine engine selectively either
- (A) opens the upstream channel to allow airflow and closes the downstream channel; or
- (B) opens the downstream channel to allow airflow and closes the upstream channel.

* * * * *

UNITED STATES PATENT AND TRADEMARK OFFICE
CERTIFICATE OF CORRECTION

PATENT NO.            : 11,867,130 B2
APPLICATION NO.       : 17/609824
DATED                 : January 9, 2024
INVENTOR(S)           : Peter Johansson It is certified that error appears in the above-identified patent and that said Letters Patent is hereby corrected as shown below:

In the Claims

Column 10, in Line 11, replace "duct of thea gas" with -- duct of the gas --.

Signed and Sealed this
Sixth Day of February, 2024

Katherine Kelly Vidal
*Director of the United States Patent and Trademark Office*